Patented Feb. 4, 1947

2,415,069

UNITED STATES PATENT OFFICE 2,415,069

PROCESS AND MANUFACTURE OF ALKYL PHENOLS

James A. Arvin, Homewood, and James V. Hunn, Chicago, Ill., assignors to The Sherwin-Williams Company, Cleveland, Ohio, a corporation of Ohio

REISSUED

DEC 20 1949

No Drawing. Application January 12, 1942, Serial No. 426,466

8 Claims. (Cl. 260—624)

The present invention relates to the manufacture of alkyl phenols, and in particular tertiary butyl phenol and tertiary octyl phenol. These respectively, are well known products of condensing phenol with isobutylene and di-isobutylene. Such condensations require a catalyst. Various catalysts have been proposed heretofore. These permit varying conditions for the condensation reaction, and in turn provide the alkyl phenols with varying amounts of impurities and varying yields.

It is an object of the present invention to produce alkyl phenols.

It is a special object of the invention to produce octyl and butyl phenols of such superior grade in the crude form that they may be used without any purification by distillation, in a condensation with formaldehyde to produce resins of superior quality for producing superior varnishes.

It is another object of the invention to use tetraphosphoric acid as the catalyst for condensing phenol and an olefin in a liquid phase reaction with or without a solid substrate.

It is a further object of the invention to use a solid substrate to improve the action of tetraphosphoric acid catalyst.

Other and ancillary objects and advantages of the invention will appear from the following description and explanation of the invention.

The present invention is directed to the use of catalysts and in particular to the use of tetraphosphoric acid as the catalyst. It also relates to the use of a secondary material or substrate, which adds to the efficiency of tetraphosphoric acid as a catalyst. Such secondary material is of the character known as surface active material, and it is particularly exemplified by acid-activated fuller's earth. However, it is not limited to acid-activated clays. Other materials are suitable such as bentonite, infusorial earth, kaolin, sand, powdered pumice, and even powdered carborundum. These are characterized by being siliceous, or containing silicon or its oxide silica as such or as a silicate, and by high specific surface. It is believed that they absorb the tetraphosphoric acid to their surfaces to increase its effectiveness. However, all materials having high specific surface are not suitable. For example, wood charcoal and animal charcoal have an opposite effect and decrease the effectiveness of tetraphosphoric acid, while ignited alumina is but slightly less depressive. The effective agents are mineral agents of high specific surface and not organic agents, as the charcoal form of carbon is considered to be.

According to the present invention the condensation is carried out using tetraphosphoric acid as a catalyst. Heretofore acids of phosphorus have been recommended, as for example by Ipatieff in U. S. Patent No. 2,046,900, which names hypo-phosphorus, ortho-phosphorus, pyro-phosphorus, hypo-phosphoric, meta-phosphoric, pyro-phosphoric, and ortho-phosphoric acids. These vary in the yields which they give, but none of them gives a yield as high as, nor properties as good as, what are obtained by using tetraphosphoric acid under similar conditions. Tetraphosphoric acid is an acid of phosphorus not heretofore considered as a catalyst, and not commonly known or available. It is described as a solid acid having the formula $H_6P_4O_{13}$ melting at 34° C., density 1.8886. (See Chemiker Zeitung 1923 vol. 47, page 195, Abstracted 17 C. A. 1929; and J. Russ Phys. Chem. Soc. 1921, vol. 53, I, p. 376–7, Abstracted 17 C. A. 3145.)

Where the secondary agent is the preferred acid-activated clay, the clay is one activated by an acid agent, such as hydrochloric acid, so that it is no doubt an acid agent having adsorbed acid on its surface. It is known in the art as a surface-catalyst when used alone. Various forms of this single catalyst are known for the condensation of olefins with phenols, and are designated as acid-activated bleaching earth, tonsil, super-filtrol, etc. See U. S. Patent No. 2,091,565. We prefer the form known as "Top notch clay," an imported variety of fuller's earth, activated by acid, and available from L. A. Solomon & Co., 216 Pearl Street, New York city. However, because non-activated clays also act in a similar way in the present invention, acid-activated clay is not essential to the present invention, nor need it be considered as an essential catalyst in the present invention.

The value and utility of an alkyl phenol is reflected in the quality and properties of phenol-aldehyde resins made from it, for use in varnishes. It is important to avoid color, and impurities, and to secure high yield. It is important in the varnish to avoid tackiness resulting from the resin. One advantage from the present invention is the fact that a crude alkyl phenol is obtainable which may be used in solution, as in mineral spirits, direct from its manufacture, without the crude alkyl phenol requiring a distillation to produce a product of purity suitable for resin manufacture. A purification by distillation results in loss of alkyl phenol over that available in the crude undistilled product. This loss may thus be avoided where it is permissible not to isolate the alkyl phenol. The undistilled phenol produced by the present invention produces directly a resin which makes a varnish free from tackiness.

In the present invention, where the clay or the like is not used, the tetraphosphoric acid as a catalyst gives an octyl phenol formaldehyde resin which when used in a varnish gives films of a light yellow shade, and hence such resins are of more limited utility than the resins from the preferred procedures. When an activated earth is used alone as catalyst, a crude alkyl phenol is obtained, the resin of which has good color but is slightly slower in drying in a varnish, and yields are lower. Also the octyl phenol formed is known to be of lower grade. But when tetraphosphoric acid is used as catalyst in combination with a substrate excellent yields of almost water-white resins result having all the desired properties, and it is known that a high grade of octyl or butyl phenol is formed. The substrate has in addition to its substrate function, a color-absorbing property, and the process is particularly conducted to exercise this function.

The crude alkyl phenol is formed by condensation in the presence of the catalyst. Then to the end-mass of the condensation a solvent, such as mineral spirits, is added, the solvent preferably being one which may be used in a subsequent step of forming the resin. Then the mass is washed with hot water one or more times, the heat preventing solidification of the alkyl phenols. Where clay is used, it settles in the water layer and is removed with the water layer, into which any residue of tetraphosphoric acid is also removed from association with the alkyl phenol. An extra step may be employed to assure removal of any residual acid of phosphorus or organic ester therewith, to avoid or minimize the possibility of ultimately forming a poorly-drying or non-drying resin or varnish, such as adding calcium carbonate as later described. The solution of crude alkyl phenol in the solvent, such as mineral spirits, is then used in a well known way for condensation with formaldehyde to form resin.

EXAMPLE 1

The following ingredients are employed:

| | Parts by weight |
|---|---|
| Phenol | 470 |
| Tetraphosphoric acid | 50 |
| Di-isobutylene | 560 |
| Mineral spirits (B. P. 200-330° F.) | 360 |
| Calcium carbonate | 3 |
| Water (except wash water) | 580 |
| Sodium bisulphite | 16 |

The phenol and tetraphosphoric acid are heated to 160° F. Then the di-isobutylene is run in slowly during one hour with efficient agitation. The batch is held at 155° F. for two hours. All the mineral spirits is added and the batch washed twice with water. Then 16 parts of the sodium bisulphite are added and the batch stirred 10 to 15 minutes at 150-160° F., and again washed with water. The calcium carbonate is added and stirred in at 150° F. for 20 minutes. Then 500 parts of wash water are added, agitation stopped and calcium precipitate allowed to settle. The mineral spirit solution of crude octyl phenol is separated and filtered, as through cheese cloth into a reaction vessel for subsequent purification, or for direct use by condensation with formalin to form a resin.

EXAMPLE 2

| | Parts by weight |
|---|---|
| Phenol (C$_6$H$_5$OH) | [1] 470 |
| Di-isobutylene | [1] 560 |
| Fuller's earth | 52 |
| Tetraphosphoric acid | 5 |
| Mineral spirits (B. P. 200°-330° F.) | 360 |
| Water (except wash water) | 580 |

[1] 5 moles.

The phenol, the fuller's earth and the tetraphosphoric acid are heated to 160° F. with violent agitation in an inert atmosphere. While maintaining the temperature at 155°-160° F., di-isobutylene is slowly added over a period of two hours. With temperature at 155°-160° F. the mass is agitated for 15 to 20 minutes after completion of said addition. The mineral spirits and wash water are added and agitated for 15 minutes. The clay settles and the clay and water are separated from the supernatant solution. The solution is again washed with water and the non-aqueous solution recovered, being first filtered as by straining through cheese cloth.

EXAMPLE 3

In Example 2 the tetraphosphoric acid is increased to 10 parts.

EXAMPLE 4

In the procedures of Examples 2 and 3, the tetraphosphoric acid is more easily removed as a phosphate by adding 33 parts of precipitated chalk when the mineral spirits and water are added. The precipitated phosphate is withdrawn with the clay.

EXAMPLE 5

| | Parts by weight |
|---|---|
| Phenol | 470 |
| Di-isobutylene | 560 |
| Tetraphosphoric acid | 10 |
| Top notch clay | 52 |
| Mineral spirits (B. P. 200-330° F.) | 360 |
| Water | 580 |
| Sodium bisulphite | 8 |

The phenol, clay and tetraphosphoric acid are mixed and heated with agitation, keeping the temperature as close as possible to 160° F. The di-isobutylene is added during two hours while maintaining this temperature. Then the mixture is held at this temperature from 10 to 15 minutes, when it is diluted with the mineral spirits. If necessary the mass is heated again to 160° F. and a solution of 8 grams of the sodium bisulphite dissolved in 1000 parts of water is added and allowed to exert its functions at 160° F. for 15 minutes. The clay and water layer are drawn off and the mineral spirit solution is washed with water.

EXAMPLE 6

In any of the preceding examples the solution of crude octyl phenol may be bleached. After the heating period following the introduction of the di-isobutylene, the mineral spirits is added along with 8 parts of sodium bisulphite in 1000 parts of water, and the liquid heated at 160° F. for 15 minutes to effect a bleaching action by the sulphur dioxide content of the sulphite. This represents the first water wash, and then a second is used where water alone is employed.

Example 7

| | Parts by weight |
|---|---|
| Phenol ($C_6H_5OH$) | [1] 470 |
| Fuller's earth | 52 |
| Tetraphosphoric acid | 10 |
| Di-isobutylene | [1] 560 |
| Mineral spirits (B. P. 200–330° F.) | 360 |
| Calcium carbonate | 3 |
| Water (not including wash water) | 580 |
| Sodium hydroxide (25%) solution | 445 |
| Formalin (38–40%) | [2] 830 |
| Sodium bisulphite | 24 |
| Electrolytic sulphuric acid | 150–155 |

[1] 5 moles.
[2] 11.1 moles.

Electrolytic sulphuric acid as above given contains 93% sulfuric acid by weight. The phenol clay and tetraphosphoric acid are heated to 160° F. with efficient agitation in a lead-lined vessel. Di-isobutylene is added during 2 to 2½ hours holding the temperature at 160° F. Then agitation is continued for 20 minutes. Mineral spirits and 16 parts of the sodium bisulphite are added, and the agitation continued for from 15 to 20 minutes. About 900 parts of wash water (not in the contents listed above) are added and stirred for 5 minutes. After settling, the water is drawn off. Then the calcium carbonate is added at 150° F., and the mass stirred for 20 minutes. Then 500 parts additional wash water are added and residual calcium carbonate allowed to settle. The water and precipitate are drawn off, and the warm solution of crude octyl phenol in the mineral spirits is filtered into a nickel-surfaced vessel, as by straining through cheese cloth.

The measured 580 parts of water, and the caustic soda solution are then added and the temperature again brought to 160° F. and maintained in the range from 160° F. to 175° F. with stirring while the formalin is added over 20 to 30 minutes. This heating is continued for an hour. Then the remaining 8 parts of bisulphite in solution form are added, followed by the sulphuric acid until slight acidity to Congo red is indicated. The water layer is discarded and the resin washed once with water (not in the list above). The resin is hardened by heating to 300° to 310° F. in about one hour, and holding at this temperature for from 15 to 20 minutes. Yield is 1100 to 1150 parts of resin.

In the foregoing examples all of the crude octyl phenol was converted directly to resin by condensation with formalin. Hence the yield of phenol was not determined. However, where the yields of resin were determined, all from 470 parts of phenol ($C_6H_5OH$), they were as follows:

| | Parts of resin |
|---|---|
| Example 2 | 1100 |
| Example 7 | 1100 to 1150 |

In order to compare the efficiency of various secondary agents or substrates a set procedure recovering the phenol has been adopted as follows:

Example 8

| | Parts by weight |
|---|---|
| Phenol | 585 |
| Fuller's earth | 57.5 |
| Tetraphosphoric acid | 12.4 |
| Di-isobutylene | 698 |
| Mineral spirits (B. P. 208–280° F.) | 448 |
| Sodium bisulfite | 17.3 |
| Calcium carbonate | 3.76 |

The phenol, fuller's earth, and tetraphosphoric acid are heated to 160° F. with efficient agitation, and the di-isobutylene is added gradually during a period of three hours while the temperature is maintained at 155–160° F. After all the di-isobutylene is in, the temperature is held at 160° F. while stirring is continued for twenty minutes. The mineral spirits and sodium bisulfite are added and the mixture is agitated for ten minutes, whereupon 1000 parts of warm water are added and the mixture agitated vigorously for another ten minutes. The layers are allowed to separate and the lower aqueous layer is drawn off and discarded. The calcium carbonate is added to the upper layer and vigorous agitation maintained for twenty minutes, followed by another wash with 1000 parts of warm water. The lower aqueous layer is carefully drawn off and the upper layer submitted to distillation in vacuo. A fore-run consisting of mineral spirits, traces of phenol and of water first distills, then the main fraction consisting of pure octyl phenol distills at 168–169° C. at 19 mm. pressure. The amount of pure product obtained equals 1220 parts by weight, which represents a 95% yield. Sometimes it is necessary to wash the solution of octyl phenol in mineral spirits with a very dilute solution of a base, such as sodium carbonate, to remove the last traces of mineral acid prior to distillation. Octyl phenol decomposes when distilled in the presence of small amounts of acid. This is one reason why a high grade crude alkyl phenol, not requiring distillation, is most valuable for high yield of high grade resin, for making superior varnishes.

The experiments employing substrates other than fuller's earth were carried out identically as above, except that the 57.5 parts of fuller's earth was replaced by an equivalent weight of other substrate. The substrates tested and the percent yield of octyl phenol from each are:

| Substrate | Per cent yield of octyl phenol |
|---|---|
| Powdered carborundum | 55.2 |
| Wood charcoal | 2.9 |
| Animal charcoal | Less than 1 |
| Powdered pumice | 46.4 |
| Aluminum oxide (ignited) | 14.5 |
| Kaolin | 70.2 |
| Sand | 47.2 |
| Infusorial earth | 85.2 |
| Bentonite | 84.4 |

Discussion

In all of the examples above given, the reaction temperature for making octyl phenol is given near 160° F. for a reason. Experience has shown that the procedures which give the purest octyl phenol show solidification of the contents at below this temperature. But where the particular process gives a less pure octyl phenol the solidification occurs at a lower temperature. Therefore, in expectation of purer products, the process is operated to avoid solidification in process. It has also been found that where the reaction occurs at higher temperatures, the crude octyl phenol is less pure, as indicated by a lower melting point when tested. Apparently higher temperatures accelerate or induce undesirable side reactions. Poorer resins result from the lower melting crude octyl phenols. However, it is not necessary to keep the reaction always at 160° F. Temperatures from 100° F. to 180° F. are permitted, but where the purer alkyl phenols are obtained, lower initial reaction temperatures may be raised to 160° F. as solidification begins to occur. This preferred procedure is suitable for the tetraphosphoric acid catalyst with or without a substrate. But where the acid-activated clay is used with the tetraprosphoric acid the product is so pure when the process is carried out at or below 160° F., that the reaction product will solidify near the end of the reaction at temperatures not much below 160° F. Therefore, it is desirable to finish the reaction at 160° F., and then upon cooling the solution, its liquidity, or degree of mushiness from partial solidification gives a very good indication of the purity of the octyl phenol upon which can be predicated the probable purity of the resin when properly made by a tested procedure.

This is quite well illustrated by variations of Example 7 in which other acids of phosphorus have been substituted for the preferred tetraphosphoric acid. The effect of the particular acid has been observed in various places in the process through to varnishes made from the resins. In the following table the vertical columns denote as follows:

A—acid used
B—amount of acid
C—heat of reaction
D—solidity of the octyl phenol solution at 75° F.
E—yield of resin
F—color of resin
G—drying time of varnish coat to a dust-free (dustable) surface, in minutes.
H—character of varnish coat after drying over night.
J—color of varnish Control refers to a reference resin made from a purified butyl phenol, merely for the purpose of comparison. The control resin has a lower aldehyde content, but when the aldehyde contents of the control and of the resin from Example 7 are the same, the drying-to-dust-free times are the same.

tially rose to 180–185° F. and was held in this range, while the isobutylene was added during two hours. After all the isobutylene was in, the reaction mixture was stirred five minutes longer at 180° F. after which the hydrogenated naphtha and sodium bisulfite were added; 1000 parts of hot water were added and vigorous agitation carried out for fifteen minutes. The lower water layer, containing suspended fuller's earth, was drawn off, and the washing operation repeated once with subsequent water separation.

The chalk was added and the mixture stirred ten minutes at 150–160° F., agitation was halted and 1000 parts of hot water added. The lower water layer was carefully drawn off and the upper phenol-naphtha layer filtered through cloth. The phenol-naphtha layer amounted to 874 parts by weight.

For the purposes of resin manufacture, the butyl phenol is not isolated. In order to determine the actual yield of butyl phenol, a 250 part aliquot of the phenol-naphtha mixture was diluted with C. P. benzene, washed once with five-percent sodium carbonate solution, then once with distilled water. The solvents were distilled under diminished pressure, leaving the crude butyl phenol which was distilled in vacuo. After a slight fore-run of colorless oil which would not solidify, there was obtained 196 parts of practically pure p-ter-butyl phenol, B. P. 122–123° C. at 15 mm., 236–238° C. at atmospheric pressure. This is equivalent to 684 parts of pure product in the original 874 parts of crude, or a yield of 91.3%.

EXAMPLE 10

The materials used in Example 9, omitting the fuller's earth and any other substrate, are employed in the same way. The reaction is more retarded where the substrate is absent, and the quick rise in temperature noted in Example 9 was absent. After 2.5 hours of adding 286 parts of isobutylene, 272 parts of it were absorbed by the reaction mass. The distilled and recovered

*Table*

| A | B | C | D | E | F | G | H | J |
|---|---|---|---|---|---|---|---|---|
| Phosphorus | 10 | Strong | Hard | 1,071 | Light | 131 | Hard with trace of tack | Light. |
| Ortho-phosphoric | 15 | ___do___ | ___do___ | 1,088 | ___do___ | 116 | Hard | Do. |
| Meta-phosphoric | 10 | Moderate | Liquid | 947 | Dark | Over 175 | Tack | Do. |
| Pyro-phosphoric | 10 | Strong | Hard | 1,118 | Light | 131 | Hard with trace of tack | Do. |
| Tetra-phosphoric | 10 | ___do___ | ___do___ | 1,150 | ___do___ | 116 | Hard | Do. |
| Control | | | | | | 136 | ___do___ | |

BUTYL PHENOL

When the condensation is carried out with isobutylene, tertiary butyl phenol results. The same principles are involved, and care is taken to avoid solidification of butyl phenol in process of production. This solidifies at a higher temperature than the octyl phenol, and therefore slightly higher temperatures are required. A longer time also has been used.

EXAMPLE 9

Parts by weight
Phenol ------------------------------ 470
Activated fuller's earth ------------ 50
Tetraphosphoric acid ---------------- 10
Isobutylene ------------------------- 280
Hydrogenated naphtha ---------------- 150
Sodium bisulfite -------------------- 5
Chalk ------------------------------- 2.5

The phenol, fuller's earth, and tetraphosphoric acid were heated to 170° F. and the introduction of isobutylene commenced. The temperature initertiary butyl phenol showed a yield of 62.5%.

It is to be appreciated that the invention is not limited to and by the specific examples herein given to illustrate the nature of the invention. Numerous changes and modifications are contemplated as falling within the scope of the appended claims.

The present application is a continuation in part of our earlier application Serial No. 211,568, filed June 3, 1938.

We claim:

1. The process of making alkyl phenols which comprises condensing substantially equimolecular proportions of phenol and of a hydrocarbon of the group consisting of isobutylene and di-isobutylene in the presence of tetraphosphoric acid as a catalyst under substantially anhydrous conditions and in the presence of an acid-activated siliceous material having high specific surface at a temperature in the range from 100° F. to 185° F. selected to avoid solidification in the reacting mass, while employing tetraphosphoric acid in an amount in the range from 1 to 10 weight units for each molecular weight unit of the phenol, mixing the mass with water and a volatile water-immiscible organic solvent for octyl phenol, whereby to form an aqueous layer containing the catalyst and a separable solvent layer containing a product of such condensation in the form of an alkyl phenol of the group consisting of butyl phenol in the case of isobutylene and octyl phenol in the case of di-isobutylene, and isolating the solvent layer as a source of alkyl phenol.

2. The process of making octyl phenol which comprises condensing substantially equimolecular proportions of di-isobutylene and phenol in the presence of tetraphosphoric acid as a catalyst under substantially anhydrous conditions, and in the presence of an acid-activated siliceous material having high specific surface at a temperature in the range from 100° F. to 180° F. selected to avoid solidification in the reacting mass, while employing tetraphosphoric acid in an amount in the range from 1 to 10 weight units for each molecular weight unit of the phenol, mixing the mass with water and a volatile water-immiscible organic solvent for octyl phenol, whereby to form an aqueous layer containing the catalyst and a separable solvent layer containing octyl phenol, and isolating the solvent layer as a source of octyl phenol.

3. The process of making butyl phenol which comprises condensing substantially equi-molecular proportions of di-isobutylene and phenol in the presence of tetraphosphoric acid as a catalyst under substantially anhydrous conditions, and in the presence of an acid-activated siliceous material having high specific surface at a temperature in the range from 100° to 185° F. selected to avoid solidification in the reacting mass, while employing tetraphosphoric acid in an amount in the range from 1 to 10 weight units for each molecular weight unit of the phenol, mixing the mass with water and a volatile water-immiscible organic solvent for butyl phenol, whereby to form an aqueous layer containing the catalyst and a separable solvent layer containing butyl phenol, and isolating the solvent layer as a source of butyl phenol.

4. In a process of making an alkyl phenol the steps which comprise heating phenol with an acid activated fuller's earth and tetraphosphoric acid, adding a hydrocarbon selected from the group consisting of isobutylene and di-isobutylene while holding the temperature within the range of 100° F. to 185° F., and subsequently separating the resultant alkyl phenol from the reaction mass, said reaction being effected under substantially anhydrous conditions.

5. In a process of making butyl phenol the steps which comprise heating together phenol and tetraphosphoric acid in the presence of an acid activated fuller's earth, and adding isobutylene to the resultant heated mixture in approximately equimolecular proportions of isobutylene to phenol, while holding the temperature during the addition of the isobutylene sufficiently high to avoid solidification and within the range of about 100° F. to about 185° F., said reaction being effected under substantially anhydrous conditions.

6. The process of making alkyl phenols which comprises condensing substantially equimolecular proportions of phenol and of a hydrocarbon of the group consisting of isobutylene and di-isobutylene in the presence of tetraphosphoric acid as a catalyst under substantially anhydrous conditions and in the presence of an acid-activated siliceous material having high specific surface at a temperature in the range from 100° F. to 185° F. selected to avoid solidification in the reacting mass, mixing the mass with water and a volatile water-immiscible organic solvent for octyl phenol, whereby to form an aqueous layer containing the catalyst and a separable solvent layer containing a product of such condensation in the form of an alkyl phenol of the group consisting of butyl phenol in the case of isobutylene and octyl phenol in the case of di-isobutylene, and isolating the solvent layer as a source of alkyl phenol.

7. The process of making octyl phenol which comprises condensing substantially equimolecular proportions of di-isobutylene and phenol in the presence of tetraphosphoric acid as a catalyst under substantially anhydrous conditions and in the presence of an acid-activated siliceous material having high specific surface at a temperature in the range from 100° F. to 180° F. selected to avoid solidification in the reacting mass, mixing the mass with water and a volatile water-immiscible organic solvent for actyl phenol, whereby to form an aqueous layer containing the cataylst and a separable solvent layer containing octyl phenol, and isolating the solvent layer as a source of octyl phenol.

8. The process of making butyl phenol which comprises condensing substantially equimolecular proportions of di-isobutylene and phenol in the presence of tetraphosphoric acid as a catalyst under substantially anhydrous conditions and in the presence of an acid-activated siliceous material having high specific surface at a temperature in the range from 100° F. to 185° F. selected to avoid solidification in the reacting mass, mixing the mass with water and a volatile water-immiscible organic solvent for butyl phenol, whereby to form an aqueous layer containing the catalyst and a separable solvent layer containing butyl phenol, and isolating the solvent layer as a source of butyl phenol.

JAMES A. ARVIN.
JAMES V. HUNN.

REFERENCES CITED

The following references are of record in the file of this patent:

UNITED STATES PATENTS

| Number | Name | Date |
| --- | --- | --- |
| 2,046,900 | Ipatieff | July 7, 1936 |
| 1,977,635 | Horsley | Oct. 23, 1934 |
| 2,050,445 | Metzger | Aug. 11, 1936 |
| 2,290,211 | Schaad | July 21, 1942 |